US012773900B2

(12) United States Patent
An

(10) Patent No.: US 12,773,900 B2
(45) Date of Patent: Oct. 27, 2026

(54) WHEEL ASSEMBLY AND VEHICLE INCLUDING THE SAME

(71) Applicants: Hyundai Motor Company, Seoul (KR); Kia Corporation, Seoul (KR)

(72) Inventor: Jea Kyoo An, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 173 days.

(21) Appl. No.: 18/784,413

(22) Filed: Jul. 25, 2024

(65) Prior Publication Data

US 2025/0187427 A1 Jun. 12, 2025

(30) Foreign Application Priority Data

Dec. 12, 2023 (KR) ........................ 10-2023-0180175

(51) Int. Cl.

*B60K 7/00* (2006.01)
*B60B 27/00* (2006.01)
*B60T 1/06* (2006.01)

(52) U.S. Cl.

CPC ........ *B60K 7/0007* (2013.01); *B60B 27/0015* (2013.01); *B60B 27/0052* (2013.01); *B60T 1/065* (2013.01); *B60K 2007/0092* (2013.01)

(58) Field of Classification Search

CPC .......... B60K 7/0007; B60K 2007/0038; B60K 2007/0061; B60K 2007/0092; F16D 55/36; F16D 65/183; F16D 2121/24; B60T 1/065; B60T 13/74; B60T 13/741; B60B 27/0015; B60B 27/0052

See application file for complete search history.

(56) References Cited

U.S. PATENT DOCUMENTS

| | | | | |
|---|---|---|---|---|
| 3,812,928 | A * | 5/1974 | Rockwell | B60L 50/51 310/67 R |
| 8,091,690 | B2 | 1/2012 | Vollert et al. | |
| 8,177,037 | B2 | 5/2012 | Kim | |
| 9,331,546 | B2 * | 5/2016 | Kim | H02K 7/14 |
| 10,479,190 | B2 * | 11/2019 | Li | B60K 7/00 |
| 2008/0230330 | A1 | 9/2008 | Herr | |
| 2010/0147633 | A1 | 6/2010 | Kim | |

(Continued)

FOREIGN PATENT DOCUMENTS

| | | | | |
|---|---|---|---|---|
| CN | 116742889 | A * | 9/2023 | B60K 1/00 |
| DE | 19620520 | A1 * | 11/1997 | F16D 49/00 |
| EP | 1972822 | B1 | 4/2010 | |

(Continued)

*Primary Examiner* — Adam D Rogers
(74) *Attorney, Agent, or Firm* — Slater Matsil, LLP

(57) ABSTRACT

A wheel assembly can include a wheel that is rotated about a reference rotation axis extending in an axial direction of the wheel assembly, a motor that is operated to provide rotational power to the wheel, a disk connected to the motor and that is rotated about the reference rotation axis together with at least a portion of the motor, and a brake module disposed between the wheel and the motor in a radial direction of the wheel assembly, which is perpendicular to the axial direction, and the brake module that presses the disk in the axial direction when the wheel is rotated relative to the motor, an operation of which is stopped by the brake module, and is spaced apart from the disk in the axial direction when the rotational power is provided to the wheel by an operation of the motor.

26 Claims, 8 Drawing Sheets

(56) References Cited

U.S. PATENT DOCUMENTS

| | | | |
|---|---|---|---|
| 2010/0258386 | A1 | 10/2010 | Vollert et al. |
| 2014/0083804 | A1 | 3/2014 | Yasuda et al. |

FOREIGN PATENT DOCUMENTS

| | | | | | |
|---|---|---|---|---|---|
| EP | 2215376 | B1 | | 2/2011 | |
| EP | 3670278 | B1 | * | 8/2022 | ............. F16D 65/18 |
| EP | 4180284 | A1 | * | 5/2023 | ............. B60T 13/36 |
| KR | 20080111609 | A | | 12/2008 | |
| KR | 101098144 | B1 | | 12/2011 | |
| KR | 101940343 | B1 | | 1/2019 | |

* cited by examiner

WHEEL ASSEMBLY AND VEHICLE INCLUDING THE SAME

CROSS-REFERENCE TO RELATED APPLICATIONS

This application claims the benefit of Korean Patent Application No. 10-2023-0180175, filed on Dec. 12, 2023, which application is hereby incorporated herein by reference.

TECHNICAL FIELD

The present disclosure relates to a wheel assembly, and a vehicle including the same.

BACKGROUND

A vehicle is provided with a brake as a device for reducing a speed of the vehicle. The brake is a device that presses wheels of the vehicle to reduce a rotational speed of the wheels. A conventional brake is operated to press the wheels of the vehicle through an external power source, such as a motor. In other words, a conventional brake is operated by a separate power source. In the vehicle, to which a conventional brake operated by a separate power source is applied, both of the brake and the power source have to be provided in the vehicle to enable braking of the vehicle.

Meanwhile, when the conventional brake is applied to a small mobility vehicle that is smaller than a conventional vehicle, a sufficient space for installing both the brake and the power source in the small mobility vehicle cannot be secured. Accordingly, there has recently been an increasing demand for wheel assemblies provided with brakes that minimize a space required for installation in small mobility vehicles.

SUMMARY

An embodiment of the present disclosure can solve the above-mentioned problems occurring in the prior art while advantages achieved by the prior art are maintained intact.

An embodiment of the present disclosure provides a wheel assembly provided with a brake that may be applied to even small vehicles as a space required for installation is minimized.

Technical problems to be solved by an embodiment of the present disclosure are not necessarily limited to the aforementioned problems, and other technical problems not mentioned herein can also be solved with an embodiment of the present disclosure, as can be understood from the following description by those skilled in the art to which the present disclosure pertains.

According to an embodiment of the present disclosure, a wheel assembly can include a wheel that is rotated about a reference rotation axis extending in an axial direction of the wheel assembly, a motor that is operated to provide rotational power to the wheel, a disk connected to the motor and that is rotated about the reference rotation axis together with at least a portion of the motor, and a brake module disposed between the wheel and the motor in a radial direction of the wheel assembly, which is perpendicular to the axial direction, and the brake module that presses the disk in the axial direction when the wheel is rotated relative to the motor, an operation of which is stopped, and is spaced apart from the disk in the axial direction when the rotational power is provided to the wheel by an operation of the motor.

Furthermore, the brake module may include a first block fixed to the motor, a second block fixed to the wheel, and that is moved in a circumferential direction of the wheel assembly with respect to the first block when the wheel is rotated relative to the motor, and a brake pad disposed to face the disk in the axial direction, and at least a portion of which presses the disk as the second block is moved.

Furthermore, a guide boss extending in a radial direction of the wheel assembly may be formed in any one of the first block and the second block, and a guide groove, into which the guide boss is inserted in the radial direction, is formed in the other one, the guide groove and the guide boss may extend along the circumferential direction, a width of the guide groove in the circumferential direction may be greater than a width of the guide boss in the circumferential direction, and the guide boss may be moved in the circumferential direction along the guide groove.

Furthermore, when a direction of the radial direction, in which the motor faces the wheel, is a first radial direction, the guide boss may be formed in the first block to have a shape protruding in the first radial direction, the guide groove may be formed in the second block to have a shape recessed in the first radial direction, and the guide boss may be inserted into the guide groove in the first radial direction.

Furthermore, widths of the guide groove and the guide boss in the axial direction may be smaller than a width thereof in the circumferential direction.

Furthermore, the brake pad may include a fixed pad end fixed to a side of the second block in the axial direction, and a free pad end extending from one side of the fixed pad end in the circumferential direction to the one side in the circumferential direction, and that is moved along the axial direction with respect to the fixed pad end.

Furthermore, the disk may include a first disk disposed on one side of the motor in the axial direction, and a second disk disposed on an opposite side of the motor in the axial direction, the brake pad may include a first brake pad that presses the first disk to the one side in the axial direction, and a second brake pad that presses the second disk in the opposite side in the axial direction, and the first brake pad and the second brake pad can be disposed to be spaced apart from each other in the axial direction with the second block being interposed therebetween.

Furthermore, the second block may include a central area defining a central portion of the second block, and connected to the brake pad, and an extension area extending from the central area to one side in the circumferential direction, and spaced apart from the brake pad in the axial direction, and the extension area may include an inclined surface extending to be inclined such that a spacing distance from the brake pad in the axial direction becomes larger as it becomes more distant from the central area.

Furthermore, the brake module may further include a pressing bearing that presses the brake pad due to relative rotation of the wheel to the motor, and the pressing bearing may be accommodated in an accommodation space formed between the brake pad and the inclined surface.

Furthermore, when the wheel assembly is viewed from one side of the wheel assembly in the axial direction in parallel to the axial direction, at least a portion of the pressing bearing, at least a portion of the inclined surface, and at least a portion of the brake pad may overlap each other.

Furthermore, when a width of the pressing bearing in the axial direction is a bearing width, the inclined surface may include a first inclined section, of which a spacing distance from the brake pad in the axial direction can be equal to or smaller than a width of the pressing bearing in the axial direction, and a second inclined section, of which a spacing distance from the brake pad in the axial direction can be greater than the width of the pressing bearing in the axial direction, the accommodation space may include a first accommodation space formed between the brake pad and the first inclined section, and a second accommodation space formed between the brake pad and the second inclined section, and the pressing bearing may press the brake pad while contacting the brake pad when being located in the first accommodation space, and may be spaced apart from the brake pad when being located in the second accommodation space.

Furthermore, the first block may include a seating area located between the pressing bearing located in the second accommodation space, and the brake pad, and defining a space for seating, and the seating area may include a first surface disposed to face the brake pad, and a second surface located on an opposite side to the first surface in the axial direction, and extending to be inclined such that the spacing distance from the brake pad in the axial direction becomes smaller as it becomes more distant from the central area.

Furthermore, the brake module may further include a pressing spring disposed at one end on the side of the extension area in the circumferential direction, and that presses the pressing bearing located in the second accommodation space in a direction facing the seating area.

Furthermore, the pressing spring may include a recess area, into which the extension area is inserted, and having a shape, in which the central area is recessed in a direction facing the extension area, and a contact area extending to be inclined to become closer to the central area as it goes from the recess area in the axial direction, and of which an end in the axial direction contacts the pressing bearing.

Furthermore, the seating area may further include a third surface extending from the second surface in the axial direction, and disposed to face the pressing spring in the circumferential direction.

Furthermore, the first block may be fixed to an outer peripheral surface of the motor, and the second block may be fixed to an inner peripheral surface of the wheel.

Furthermore, each of the first block and the second block may have a shape being symmetrical with respect to the axial direction.

Furthermore, each of the first block and the second block may have a shape being symmetrical with respect to the circumference direction.

Furthermore, the brake module may further include a plurality of pressing bearings that presses the brake pad due to relative rotation of the wheel to the motor, and the plurality of pressing bearings may be disposed to be spaced apart from each other between the first block and the second block, and may be arranged to be symmetrical with respect to the axial direction and the circumferential direction.

Furthermore, the wheel assembly may further include a guide unit disposed between an outer peripheral surface of the motor and an inner peripheral surface of the wheel, and that guides relative rotation of the wheel to the motor.

Furthermore, the guide unit may include a first guide area connected to the outer peripheral surface of the motor, a second guide area connected to the inner peripheral surface of the wheel, and spaced apart from the first guide area in a radial direction of the wheel assembly, and a guide roller disposed between the first guide area and the second guide area in the radial direction, and that guides movement of the second guide area with respect to the first guide area in the circumferential direction of the wheel assembly.

Furthermore, the guide roller may include a first roller and a second roller spaced apart from each other along the axial direction, the first guide area includes a first seating surface, on which the first roller is seated, and a second seating surface, on which the second roller is seated, a roller seating space, in which a portion of the guide roller is located, may be formed between the first seating surface and the second seating surface, in the axial direction, and when a direction of the radial direction of the wheel assembly, in which the motor faces the wheel, is a first radial direction, and the roller seating space may have a shape, of which a width in the axial direction becomes larger as it goes in the first radial direction.

Furthermore, when a direction of the axial direction, in which the second seating surface faces the first seating surface, is a first axial direction, and an opposite direction to the first axial direction is a second axial direction, the first seating surface may extend to be inclined to have a shape, of which a spacing distance from the motor in the radial direction becomes larger as it goes in the first axial direction, the second seating surface may extend to be inclined to have a shape, of which a spacing distance from the motor in the radial direction becomes larger as it goes in the second axial direction, the first roller may be rotated about a first roller rotation axis extending in a direction, in which the first seating surface extends, and the second roller may extend in a direction, in which the second seating surface extends, and is rotated about a second roller rotation axis crossing the first roller rotation axis.

Furthermore, a plurality of guide units and a plurality of brake modules may be provided, and the plurality of guide units and the plurality of brake modules may be alternately arranged along the circumferential direction of the wheel assembly.

Furthermore, the wheel assembly may further include a shaft passing through a center of the motor and a center of the disk, and defining the reference rotation axis.

According to an embodiment of the present disclosure, a vehicle can include a vehicle body, a wheel assembly that moves the vehicle body, a wheel that is rotated about a reference rotation axis extending in an axial direction of the wheel assembly, a motor that is operated to provide rotational power to the wheel, a disk connected to the motor and that is rotated about the reference rotation axis together with at least a portion of the motor, and a brake module disposed between the wheel and the motor in a radial direction of the wheel assembly, which is perpendicular to the axial direction, and the brake module presses the disk in the axial direction when the wheel is rotated relative to the motor, an operation of which is stopped, and is spaced apart from the disk in the axial direction when the rotational power is provided to the wheel by an operation of the motor.

BRIEF DESCRIPTION OF THE DRAWINGS

The above and other features and advantages of the present disclosure can be more apparent from the following detailed description taken in conjunction with the accompanying drawings, in which.

DETAILED DESCRIPTION OF ILLUSTRATIVE EMBODIMENTS

Figure 1:
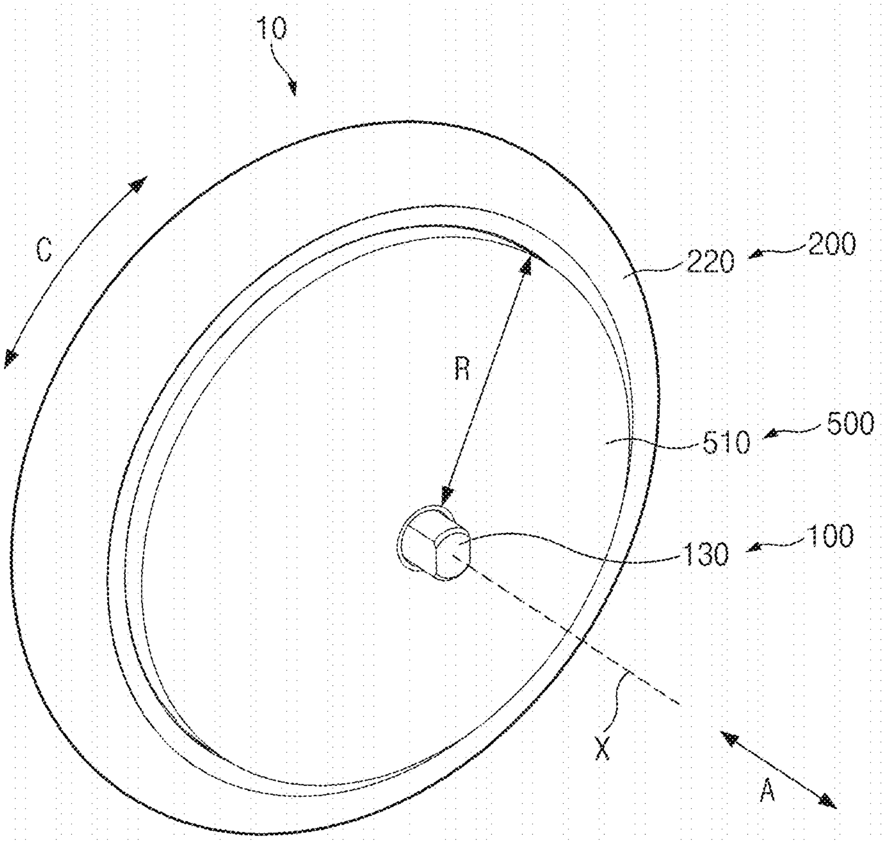
FIG. 1 is a perspective view of a wheel assembly according to an embodiment of the present disclosure.

Hereinafter, example embodiments of the present disclosure will be described in detail with reference to the accompanying drawings. In adding reference numerals to the components of the drawings, it is noted that same components can be denoted by same reference numerals even when they are drawn in different drawings. Furthermore, in describing the example embodiments of the present disclosure, when it is determined that a detailed description of related known configurations and functions may hinder understanding of the embodiments of the present disclosure, a detailed description thereof can be omitted.

Hereinafter, a wheel assembly 10 and a vehicle including the same according to an example embodiment of the present disclosure will be described with reference to the drawings.

Figure 2:
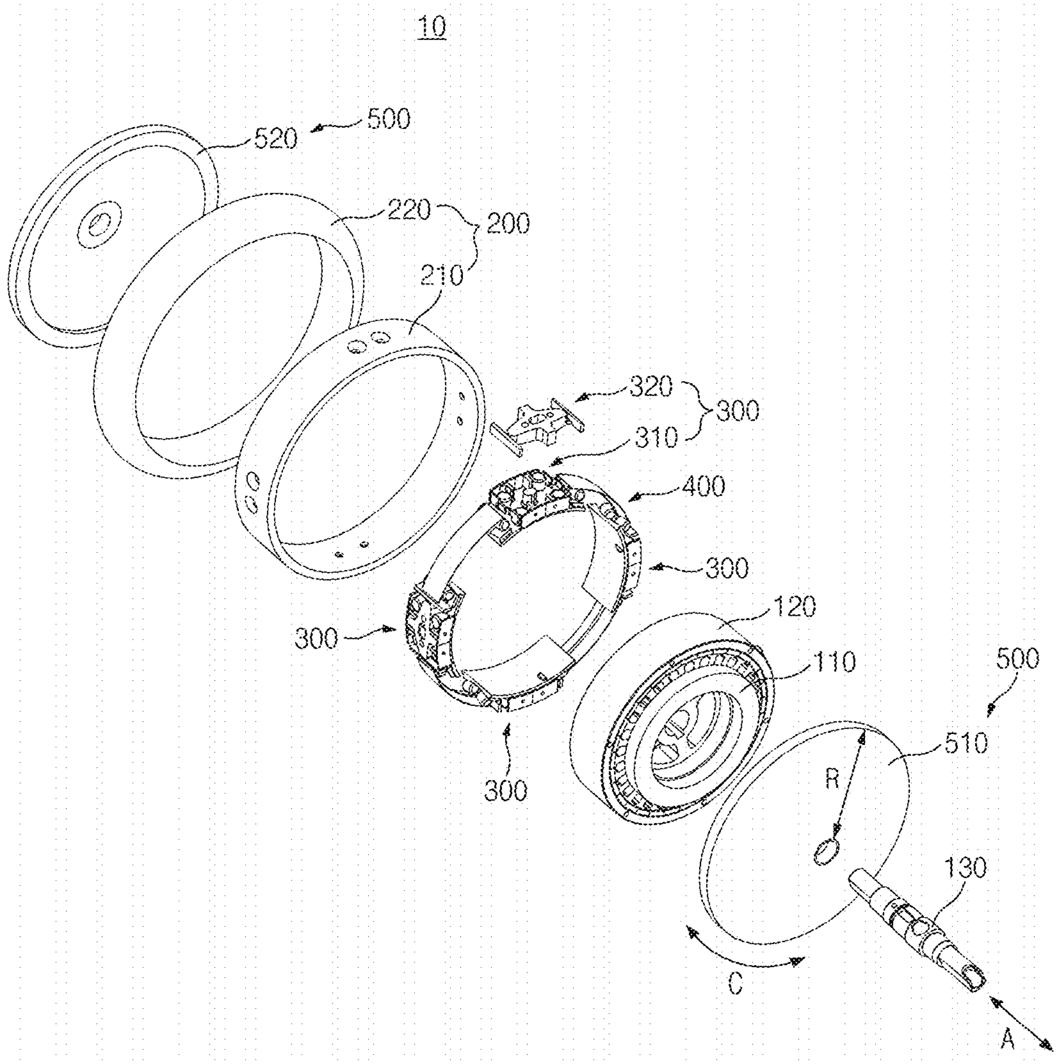
FIG. 2 is an exploded perspective view of a wheel assembly according to an embodiment of the present disclosure.

FIG. 1 is a perspective view of a wheel assembly according to an embodiment of the present disclosure. FIG. 2 is an exploded perspective view of the wheel assembly according to an embodiment of the present disclosure.

The vehicle may be a small mobility vehicle that is smaller than a conventional vehicle. The vehicle may include a vehicle body and a wheel assembly 10. A plurality of wheel assemblies 10 may be provided. The plurality of wheel assemblies 10 may include a pair of front wheel assemblies that are mounted on a front side of the vehicle body, and a pair of rear wheel assemblies that are mounted on a rear side of the vehicle body.

The wheel assembly 10 may perform a parking brake function for preventing the vehicle from rolling along a slope when the vehicle is located on an inclined ground (a slope). The wheel assembly 10 may include a motor 100, a wheel 200, a brake module 300, a guide unit 400, and a disk 500, any combination of or all of which may be in plural or may include plural components thereof.

The motor 100 may provide rotational power to the wheel 200. The motor 100 may include a rotor 110, a stator (not illustrated), a housing 120, and a shaft 130. The rotor 110 may be rotated around a reference rotation axis "X". The reference rotation axis "X" may be defined as an imaginary straight line that extends along an axial direction "A" (hereinafter, 'an axial direction "A"') of the wheel assembly 10. Furthermore, a radial direction "R" (hereinafter, 'a radial direction "R"') of the wheel assembly 10 may be a direction that is perpendicular to the axial direction "A" and becomes more distant from the reference rotation axis "X" or closer to the reference rotation axis "X". Furthermore, a circumferential direction "C" (hereinafter, 'a circumferential direction "C"') of the wheel assembly 10 may be a direction in which the wheel assembly 10 is rotated about the reference rotation axis "X".

The rotor 110 may be rotated about a reference rotation axis "X" with respect to the stator. The stator may be not rotate, and a position thereof with respect to the vehicle body may be fixed. The stator may be disposed in a hollow that is formed in the rotor 110.

The housing 120 may be disposed to surround an outer peripheral surface of the rotor 110. For example, the housing 120 may have an annular ring shape having a hollow in an interior thereof. Furthermore, the rotor 110 may be disposed in the hollow of the housing 120. The housing 120 may be rotated together with the rotor 110 while being fixed to the rotor 110.

The shaft 130 may define a reference rotation axis "X". The shaft 130 may extend along an axial direction "A". Furthermore, the shaft 130 may be disposed to pass through a center of the motor 100. Moreover, the shaft 130 may be disposed to pass through the center of the motor 100 and a center of the disk 500. The shaft 130 may be rotated together with the rotor 110 and the disk 500. In other words, the shaft 130 may be fixed to the rotor 110 and the disk 500. Furthermore, one end of the shaft 130 may be coupled to the vehicle body.

The wheel 200 may be rotated about the reference rotation axis "X". The wheel 200 may receive rotational power from the motor 100. When the wheel 200 does not receive rotational power from the motor 100, it may be rotated with respect to the motor 100. The wheel 200 may include a rim 210 and a tire 220.

The rim 210 may be disposed to surround an outer peripheral surface of the motor 100. For example, a hollow may be formed in an interior of the rim 210. The motor 100 may be disposed in the hollow of the rim 210.

The tire 220 may support the vehicle body while on the ground. The tire 220 may be disposed to surround an outer peripheral surface of the rim 210. The tire 220 may be fixed to the rim 210.

Figure 3:
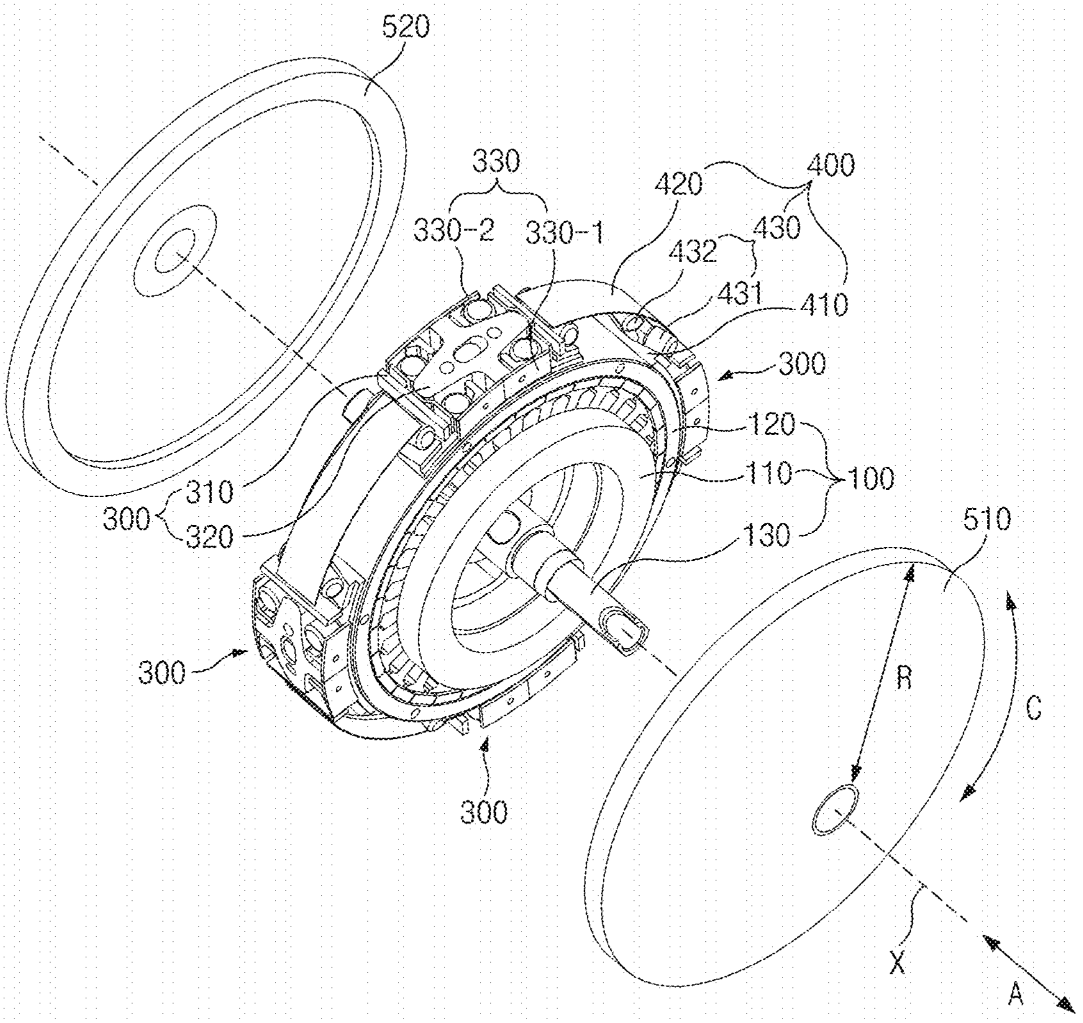
FIG. 3 is a view illustrating a state, in which a disk is separated from a motor, a brake module, and a guide unit according to an embodiment of the present disclosure.

FIG. 3 is a view illustrating a state, in which the disk is separated from the motor, the brake module, and the guide unit according to an embodiment of the present disclosure.

Referring further to FIG. 3, the brake module 300 may press the disk 500 in the axial direction "A" or may be spaced apart from the disk 500 in the axial direction "A". For example, when the brake module 300 presses the disk 500 in the axial direction "A", the rotation of the disk 500 may be restricted. When the rotation of the disk 500 is restricted, the rotation of the shaft 130 that is fixed to the disk 500 may be limited. When the rotation of the shaft 130 is limited, the rotation of the rotor 110 that is fixed to the shaft 130 may be limited. When the rotation of the rotor 110 is restricted, the rotation of the rim 210 may be restricted. For example, the rotor 110 and the rim 210 may be connected to each other by a brake module 300. As a detailed example, the brake module 300 may connect the rotor 110 and the rim 210 such that any one of the rotor 110 and the rim 210 is allowed to be rotated in a circumferential direction "C" by a rotation angle in a specific range with respect to the other one.

The brake module 300 may press the disk 500 in the axial direction when the wheel 200 is rotated relative to the motor 100 in a state in which an operation of the motor 100 is stopped. For example, when the wheel 200 is rotated relative to the motor 100 while the operation of the motor 100 is stopped, the brake module 300 may contact the disk 500, and the rotation of the disk 500 may be limited by frictions caused by the contact with the brake module 300.

Furthermore, the brake module 300 may be spaced apart from the disk 500 in the axial direction "A" when the rotational power is provided to the wheel 200 by the operation of the motor 100. In other words, the brake module

300 may or may not press the disk 500, which can be dependent on whether the motor 100 is operated.

The brake module 300 may be disposed between the wheel 200 and the motor 100 in the radial direction "R". For example, the brake module 300 may be disposed between an inner peripheral surface of the wheel 200 and an outer peripheral surface of the motor 100. A plurality of brake modules 300 may be provided. The plurality of brake modules 300 may be disposed to be spaced apart from each other along the circumferential direction "C". The brake module 300 may include a first block 310, a second block 320, a brake pad 330, a pressing bearing 340, and a pressing spring 350, any combination of or all of which may be in plural or may include plural components thereof.

Figure 4:
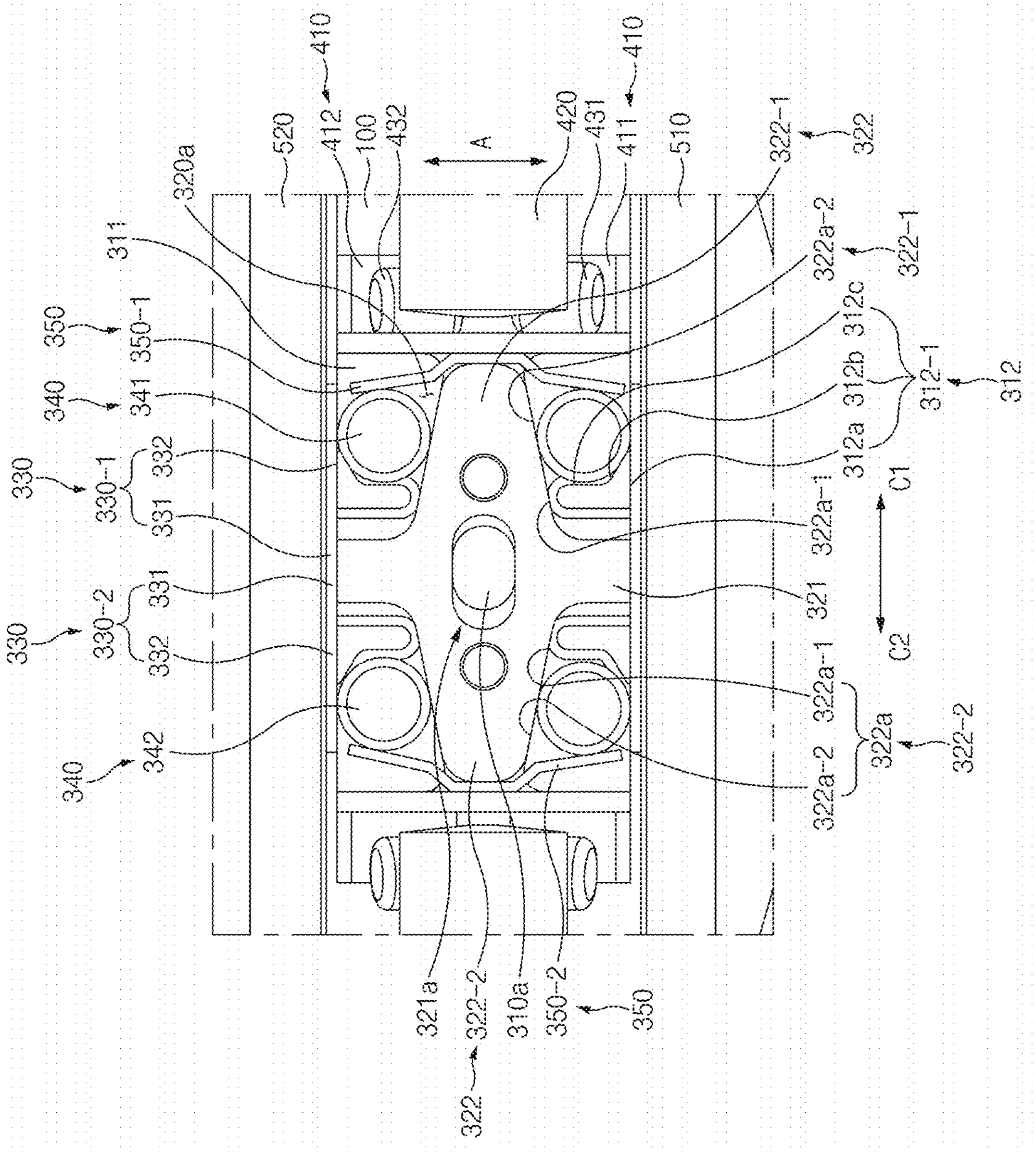
FIG. 4 is an enlarged view of a brake module according to an embodiment of the present disclosure.
Figure 5:
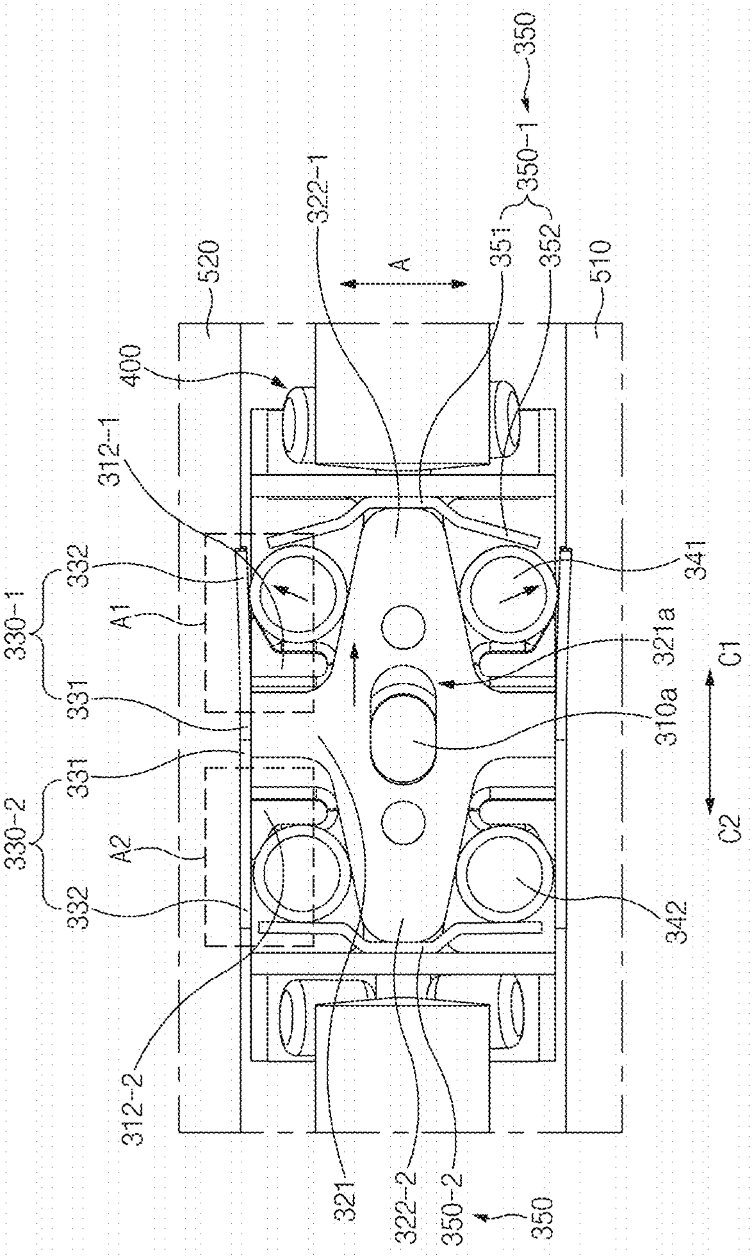
FIG. 5 is a view illustrating a state, in which a second block of FIG. 4 is moved in a first circumferential direction with respect to a first block.

FIG. 4 is an enlarged view of the brake module according to an embodiment of the present disclosure. FIG. 5 is a view illustrating a state, in which the second block of FIG. 4 is moved in the first circumferential direction with respect to the first block.

Referring further to FIGS. 2-5, the first block 310 may be fixed to the motor 100. For example, the first block 310 may be fixed to an outer peripheral surface of the housing 120 of the motor 100. The first block 310 may be rotated about the reference rotation axis "X" together with the rotor 110.

The first block 310 may have a shape that is symmetrical with respect to the axial direction "A" for wheel balancing. For example, when a plane that passes through a center of the first block 310 and is perpendicular to the axial direction "A" is a first plane, the first block 310 may have a shape that is symmetrical with respect to the first plane.

Furthermore, the first block 310 may have a shape that is symmetrical with respect to the circumferential direction "C". For example, when a plane that passes through a center of the first block 310 and is perpendicular to the circumferential direction "C" is a second plane, the first block 310 may have a shape that is symmetrical with respect to the second plane. The first block 310 may have a shape that is rotationally symmetrical twice (180 degrees) about a rotation axis that passes through the center of the first block 310 and extends in the radial direction "R".

As such, because the first block 310 can have a shape that is symmetrical in the axial direction "A" and the circumferential direction "C", it can be easy to replace an existing first block with a new first block. Furthermore, through the symmetrical shape of the first block 310, an easy assembly can be possible in a process of replacing the existing first block with a new first block. The first block 310 may include a base area 311 and a seating area 312. Furthermore, a guide boss 310*a* may be formed in the first block 310.

The base area 311 may be connected to an outer peripheral surface of the housing 120. The seating area 312 may extend from the base area 311 in a direction that becomes more distant from the reference rotation axis "X", in a radial direction "R". The pressing bearing 340 may be seated in this seating area 312. For example, when the brake module 300 and the disk 500 are separated from each other, the pressing bearing 340 may be seated and supported on the seating area 312. The seating area 312 may include a first surface 312*a*, a second surface 312*b*, and a third surface 312*c*.

The first surface 312*a* may be a surface of the seating area 312 that faces the brake pad 330 in the axial direction "A". The second surface 312*b* may be disposed on an opposite side to the first surface 312*a* in the axial direction "A". The second surface 312*b* may obliquely extend from one end of the first surface 312*a*. For example, the second surface 312*b* may obliquely extend such that a spacing distance between the brake pad 330 and the axial direction "A" becomes smaller as it becomes more distant from a central area 321, which will be described later.

The third surface 312*c* may extend from one end of the second surface 312*b* in the axial direction "A". For example, the third surface 312*c* may extend in the axial direction "A" from one end of the second surface 312*b* toward a center of the base area 311. The first surface 312*a*, the second surface 312*b*, and the third surface 312*c* may be integrally formed.

A plurality of seating areas 312 may be provided. The plurality of seating areas 312 may include a first seating area 312-1 and a second seating area 312-2. The first seating area 312-1 may be disposed on a side of the center of the base area 311 in a first circumferential direction C1. A opposite direction in the first circumferential direction C1 can be defined as a second circumferential direction C2, and the first circumferential direction C1 and the second circumferential direction C2 may be included in the circumferential direction "C". With reference to when one side of the wheel assembly 10 in the axial direction "A" is viewed in parallel to the axial direction "A", any one of the first circumferential direction C1 and the second circumferential direction C2 may be a clockwise direction, and the other one may be a counterclockwise direction.

A plurality of first seating areas 312-1 may be provided. For example, the plurality of first seating areas 312-1 may be provided as a pair of first seating areas 312-1 that are symmetrical to each other with respect to the first plane. The pair of first seating areas 312-1 may be spaced apart from each other in the axial direction "A".

The second seating area 312-2 may be disposed on a side of a center of the base area 311 in the second circumferential direction C2. A plurality of second seating areas 312-2 may be provided. For example, the plurality of second seating areas 312-2 may be provided as a pair of second seating areas 312-2 that are symmetrical to each other with respect to the first plane. The pair of second seating areas 312-2 may be spaced apart from each other in the axial direction "A".

The plurality of first seating areas 312-1 and the plurality of second seating areas 312-2 may be arranged to be spaced apart from each other in the circumferential direction "C" with the center of the base area 311 being interposed therebetween. For example, the plurality of first seating areas 312-1 and the plurality of second seating areas 312-2 may be arranged to be symmetrical to each other with respect to the second plane.

The guide boss 310*a* may have a shape that protrudes from a central portion of the base area 311 in the first radial direction. The first radial direction can be parallel to the radial direction "R" and may be a direction in which the base area 311 faces an inner peripheral surface of the wheel 200.

A width of the guide boss 310*a* in the axial direction "A" may be different from a width of the guide boss 310*a* in the circumferential direction "C". For example, a width of the guide boss 310*a* in the axial direction "A" may be smaller than a width of the guide boss 310*a* in the circumferential direction "C".

The second block 320 may be fixed to the wheel 200. For example, the second block 320 may be fixed to an inner peripheral surface of the rim of the wheel 200. The second block 320 may be rotated about the reference rotation axis "X" together with the wheel 200.

The second block 320 may be moved in the circumferential direction "C" with respect to the first block 310 when the wheel 200 is rotated relative to the motor 100. The second block 320 may have a shape that is symmetrical with respect to the axial direction "A". For example, when a plane that passes through a center of the second block 320 and is perpendicular to the axial direction "A" is a third plane, the second block 320 may have a shape that is symmetrical with respect to the third plane.

Furthermore, the second block 320 may have a shape that is symmetrical with respect to the circumferential direction "C". For example, when a plane that passes through the center of the second block 320 and is perpendicular to the circumferential direction "C" is a fourth plane, the second block 320 may have a shape that is symmetrical with respect to the fourth plane. The second block 320 may have a shape that is rotationally symmetrical twice (180 degrees) with respect to a rotation axis that passes through a center of the second block 320 and extends in the radial direction "R".

As such, because the second block 320 has a shape that is symmetrical in the axial direction "A" and the circumferential direction "C", it can be easy to replace an existing second block with a new second block. Furthermore, through the symmetrical shape of the second block 320, an easy assembly can be possible in a process of replacing the existing second block with a new second block. The second block 320 may include a central area 321 and an extension area 322.

The central area 321 may define a central portion of the second block 320. The central area 321 may be connected to brake pads 330. The central area 321 may have a shape that protrudes in the axial direction "A" with respect to the extension area 322. For example, a width of the central area 321 in the axial direction "A" may be greater than a width of the extension area 322 in the axial direction "A". A guide groove 321*a* may be formed in the central area 321.

The guide boss 310*a* may be inserted into the guide groove 321*a* in the second radial direction. The second radial direction may be a direction that is parallel to the radial direction "R", and in which the wheel 200 faces the motor 100. The guide groove 321*a* may have a shape that is recessed in the central area 321 in the second radial direction. A width of the guide groove 321*a* in the axial direction "A" may be different from a width of the guide groove 321*a* in the circumferential direction "C". For example, a width of the guide groove 321*a* in the axial direction "A" may be smaller than a width of the guide boss 310*a* in the circumferential direction "C".

A width of this guide groove 321*a* in the circumferential direction "C" may be greater than a width of the guide boss 310*a* in the circumferential direction "C". In this way, because the width of the guide groove 321*a* in the circumferential direction "C" is formed to be greater than a width of the guide boss 310*a* in the circumferential direction "C", the guide boss 310*a* may be moved along the circumferential direction "C" while being inserted into the guide groove 321*a*.

The extension area 322 may extend from the central area 321 to one side in the circumferential direction "C". The extension area 322 may include a section of which a width in the axial direction "A" becomes smaller as it becomes more distant from the central area 321 (e.g., wedge shaped). The extension area 322 may be spaced apart from the brake pad 330 in the axial direction "A". The extension area 322 may include an inclined surface 322*a*.

The inclined surface 322*a* may be obliquely extended such that a spacing distance between the brake pad 330 and the axial direction "A" increases as a distance from the central area 321 increases. The inclined surface 322*a* may define opposite side surfaces of the extension area 322 in the axial direction "A". A plurality of inclined surfaces 322*a* may be provided on opposite sides of the extension area 322 in the axial direction "A".

A spacing distance between the plurality of inclined surfaces 322*a* in the axial direction "A" may become smaller as it becomes more distant from the central area 321. Furthermore, each of the plurality of inclined surfaces 322*a* may be disposed to be symmetrical with respect to the third plane. The inclined surface 322*a* may include a first inclined section 322*a*-1 and a second inclined section 322*a*-2.

The first inclined section 322*a*-1 may be defined as a section of the inclined surface 322*a*, in which a spacing distance from the brake pad 330 in the axial direction "A" is equal to or smaller than a width of the pressing bearing 340 in the axial direction "A". For example, when the pressing bearing 340 is located between the first inclined section 322*a*-1 and the brake pad 330, the pressing bearing 340 may contact the brake pad 330. A space formed between the first inclined section 322*a*-1 and the brake pad 330 may be named a first accommodation space. The first accommodation space may be included in an accommodation space 320*a* that will be described later. The accommodation space 320*a* may be a space that is formed between the second block 320 and the brake pad 330. A pressing bearing 340 may be accommodated in the accommodation space 320*a*.

A plurality of accommodation spaces 320*a* may be provided. The plurality of accommodation spaces 320*a* may be partitioned by the second block 320. For example, four accommodation spaces 320*a* may be provided. Among the four accommodation spaces 320*a*, two accommodation spaces 320*a* that are relatively located on a side in the first circumferential direction C1 may be partitioned by a first extension area 322-1, and may be surrounded by the first extension area 322-1 and the brake pad 330.

Furthermore, among the four accommodation spaces 320*a*, two accommodation spaces 320*a* that are relatively located on a side in the second circumferential direction C2 may be partitioned by a second extension area 322-2, and may be surrounded by the second extension area 322-2 and the brake pad 330.

The second inclined section 322*a*-2 may be defined as a section of the inclined surface 322*a*, in which a spacing distance from the brake pad 330 in the axial direction "A" is greater than a width of the pressing bearing 340 in the axial direction "A". For example, when the pressing bearing 340 is located between the second inclined section 322*a*-2 and the brake pad 330, the pressing bearing 340 may be spaced apart from the brake pad 330. The space that is formed between the second inclined section 322*a*-2 and the brake pad 330 may be named a second accommodation space. The second accommodation space may be included in the accommodation space 320*a*. Furthermore, the first inclined section 322*a*-1 and the second inclined section 322*a*-2 may be integrally formed.

Furthermore, a plurality of extension areas 322 may be provided. The plurality of extension areas 322 may include a first extension area 322-1 and a second extension area 322-2. The first extension area 322-1 may extend from the central area 321 in the first circumferential direction C1. The first extension area 322-1 may include a section, of which a width in the axial direction "A" becomes smaller as it goes in the first circumferential direction C1.

The second extension area 322-2 may extend from the central area 321 in the second circumferential direction C2. The second extension area 322-2 may include a section, of which a width in the axial direction "A" becomes smaller as it goes in the second circumferential direction C2.

The first extension area 322-1 and the second extension area 322-2 may be spaced apart from each other in the circumferential direction "C" with the central area 321 being interposed therebetween. The first extension area 322-1 and the second extension area 322-2 may be disposed to be symmetrical with respect to the fourth plane. As an example, the first extension area 322-1, the second extension area 322-2, and the central area 321 may be integrally formed.

Figure 6:
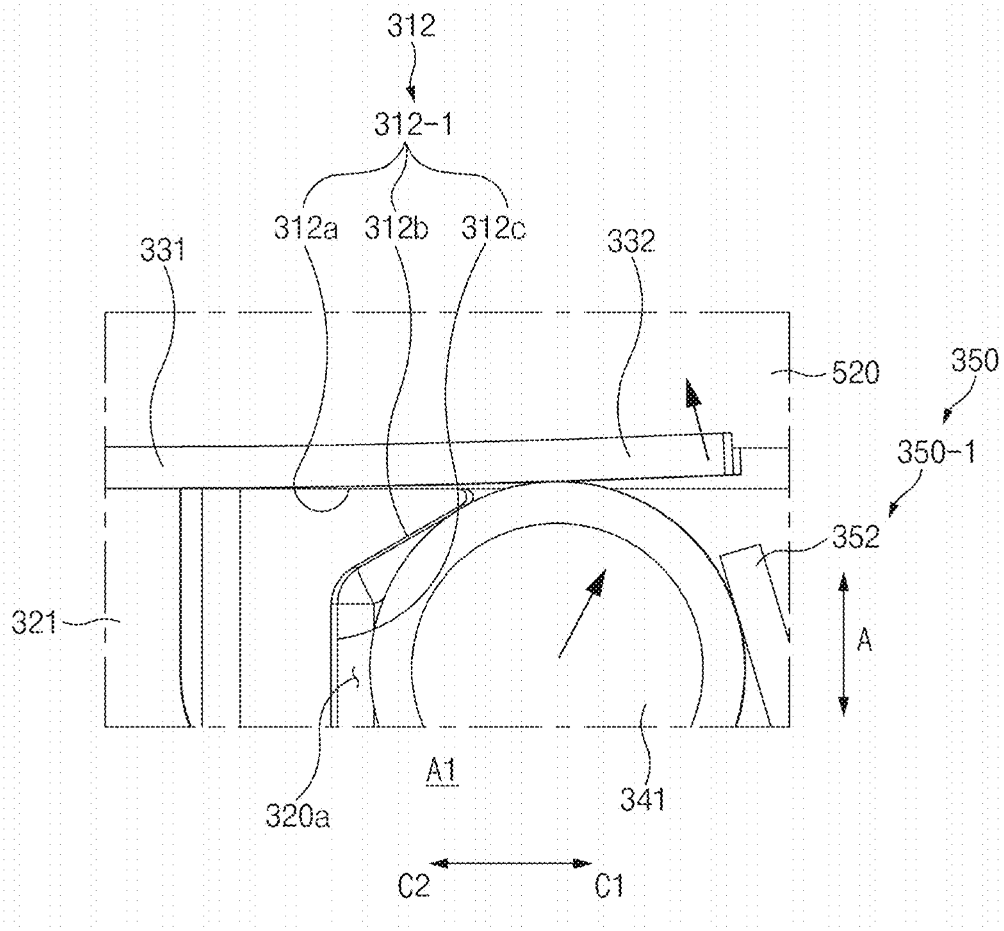
FIG. 6 is an enlarged view of area 'A1' from FIG. 5.
Figure 7:
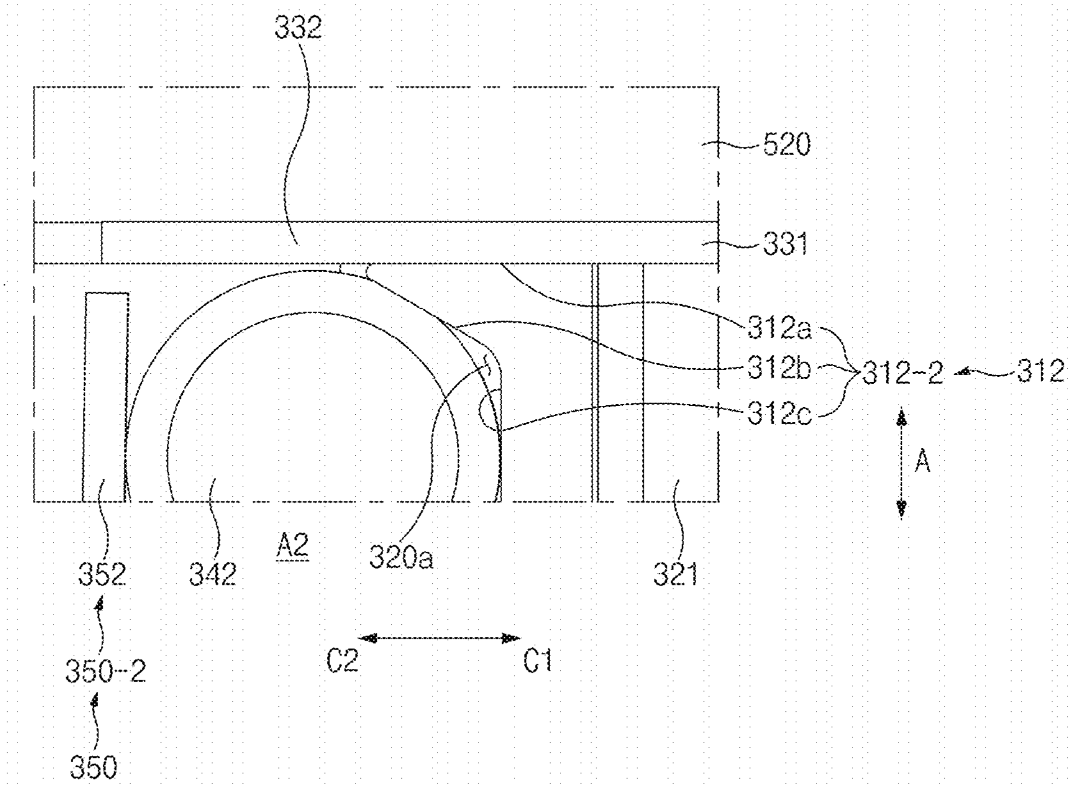
FIG. 7 is an enlarged view of area 'A2' from FIG. 5.

FIG. 6 is an enlarged view of area 'A1' of FIG. 5. FIG. 7 is an enlarged view of area 'A2' of FIG. 5.

Referring further to FIGS. 6 and 7, along with FIGS. 2-5, the brake pad 330 may press the disk 500 by moving the second block 320 relative to the first block 310. A plurality of brake pads 330 may be provided to be connected to opposite ends of the second block 320 in the axial direction "A". The plurality of brake pads 330 may be arranged to be spaced apart from each other in the axial direction "A" with the second block 320 being interposed therebetween. The brake pad 330 may include a fixed pad end 331 and a free pad end 332.

The fixed pad end 331 may be fixed to one end of the central area 321 of the second block 320 in the axial direction "A". The free pad end 332 may be configured to be movable along the axial direction "A" with respect to the fixed pad end 331. The free pad end 332 may extend from one side of the fixed pad end 331 in the circumferential direction "C", to one side in the circumferential direction "C".

The fixed pad end 331 may be a fixed end relative to the free pad end 332, and the free pad end 332 may be a free end relative to the fixed pad end 331. As an example, the brake pad 330 may be a leaf spring, on which an elastic force can be applied in the axial direction "A".

A plurality of brake pads 330 may be provided. The plurality of brake pads 330 may include a first brake pad 330-1 and a second brake pad 330-2. The first fixed pad end that is the fixed pad end 331 of the first brake pad 330-1 may be connected to one side of the central area 321 in the first circumferential direction C1. The first free pad end that is the free pad end 332 of the first brake pad 330-1 may extend from one side end of the first fixed pad end in the first circumferential direction C1.

The second fixed pad end that is the fixed pad end 331 of the second brake pad 330-2 may be connected to a side of the central area 321 in the second circumferential direction C2. The second free pad end that is the free pad end 332 of the second brake pad 330-2 may extend from a side of the second fixed pad end in the second circumferential direction C2. The second brake pad 330-2 and the first brake pad 330-1 may be disposed to be symmetrical with respect to the fourth plane.

The pressing bearing 340 may press the brake pad 330 in the axial direction "A" by rotating the wheel 200 relative to the motor 100. For example, the pressing bearing 340 may press the brake pad 330 in the axial direction "A" by moving the second block 320 relative to the first block 310. The pressing bearing 340 may be accommodated in the accommodation space 320*a*.

The pressing bearing 340 may be moved between the first accommodation space and the second accommodation space by moving the second block 320 relative to the first block 310. For example, referring to FIG. 6, a path, along which the pressing bearing 340 located in the first accommodation space can be moved to the second accommodation space, may be formed in, among the circumferential direction "C" and the axial direction "A", a direction that faces the brake pad 330. Furthermore, referring to FIG. 7, a path, along which the pressing bearing 340 located in the second accommodation space can be moved to the first accommodation space, may be formed along, among the circumferential direction "C" and the axial direction "A", a direction that becomes more distant from the brake pad 330.

As an example, this pressing bearing 340 may have a cylindrical shape that extends in the radial direction "R". Furthermore, when the wheel assembly 10 is viewed in parallel to the axial direction "A" on one side of the wheel assembly 10 in the axial direction "A", at least a portion of the pressing bearing 340, at least a portion of the inclined surface 322*a*, at least a portion of the brake pad 330 may overlap each other.

A plurality of such pressing bearings 340 may be provided. The plurality of pressing bearings 340 may include a first pressing bearing 341 and a second pressing bearing 342. A plurality of first pressing bearings 341 may be provided. For example, two first pressing bearings 341 may be provided to be spaced apart from each other in the axial direction "A", and may be accommodated in two accommodation spaces 320*a* that are spaced apart from each other in the axial direction "A", respectively. The first pressing bearing 341 may be disposed on a side that is closer the first circumferential direction C1 than the second pressing bearing 342.

A plurality of second pressing bearings 342 may be provided. For example, two second pressing bearings 342 may be provided to be spaced apart from each other in the axial direction "A", and may be accommodated in two accommodation spaces 320*a* that are spaced apart from each other in the axial direction "A", respectively. Furthermore, the first pressing bearing 341 and the second pressing bearing 342 may be disposed to be spaced apart from each other in the circumferential direction "C".

Referring again to FIGS. 4 and 5, the pressing spring 350 may press the pressing bearing 340 that is located in the second accommodation space in a direction that faces the seating area 312. The pressing spring 350 may be disposed at one end of the extension area 322 in the circumferential direction "C". Furthermore, when the wheel assembly 10 is viewed in parallel to the circumferential direction "C" from one side of the wheel assembly 10 in the radial direction "R", at least a portion of the pressing bearing 340, at least a portion of the central area 321, at least a portion of the pressing spring 350 may overlap each other. The pressing spring 350 may include a recess area 351 and a contact area 352.

The recess area 351 may have a shape, in which the central area 321 is recessed in a direction that faces the extension area 322. An end of the extension area 322 may be inserted into the recess area 351. The recess area 351 may be fixed to an end of the extension area 322. The recess area 351 may define a central portion of the pressing spring 350.

The contact area 352 may extend from the recess area 351 generally along the axial direction "A". For example, the contact area 352 may extend obliquely from the recess area 351 to become closer to the central area 321 in the axial direction "A". For example, the contact area 352 may extend along the axial direction "A" from opposite ends of the recess area 351 in the axial direction "A".

Furthermore, an end portion of the contact area 352 in the axial direction "A" may contact the pressing bearing 340. The contact area 352 may be elastically moved along the circumferential direction "C" with respect to the recess area 351. The contact area 352 may be a free end relative to the recess area 351, and the recess area 351 may be a fixed end relatively to the contact area 352.

A plurality of pressing springs 350 may be provided. The plurality of pressing springs 350 may be arranged to be spaced apart from each other in the circumferential direction "C". The pressing spring 350 may include a first pressing spring 350-1 and a second pressing spring 350-2.

The first pressing spring 350-1 may be fixed to an end of the first extension area 322-1 in the first circumferential direction C1. The first pressing spring 350-1 may contact the first pressing bearing 341.

The second pressing spring 350-2 may be fixed to an end of the second extension area 322-2 in the second circumferential direction C2. The second pressing spring 350-2 may contact the second pressing bearing 342.

The first pressing spring 350-1 and the second pressing spring 350-2 may be arranged to be spaced apart from each other in the circumferential direction "C" with the second block 320 being interposed therebetween. Furthermore, the first pressing spring 350-1 and the second pressing spring 350-2 may be arranged to symmetrical with respect to the fourth plane.

Referring back to FIGS. 3 and 4, the guide unit 400 may guide the rotation of the wheel 200 with respect to the motor 100. A plurality of guide units 400 may be provided. The plurality of guide units 400 may be arranged to be spaced apart from each other along the circumferential direction "C". For example, the plurality of brake modules 300 and the plurality of guide units 400 may be arranged to alternate with each other along the circumferential direction "C". The guide unit 400 may include a first guide area 410, a second guide area 420, and a guide roller 430.

The first guide area 410 may be connected to an outer peripheral surface of the motor 100. For example, the first guide area 410 may be disposed on the base area 311. As an example, this first guide area 410 may be integrally formed with the base area 311. The first guide area 410 may include a first seating surface 411 and a second seating surface 412.

A first roller 431 that will be described later may be seated on the first seating surface 411. For example, the first seating surface 411 may contact the first roller 431. The first seating surface 411 may extend obliquely in the first radial direction (a direction of the radial direction "R", in which the motor 100 faces the wheel 200) to be inclined in the first axial direction (e.g., wedge shaped). For example, the first seating surface 411 may extend obliquely such that a spacing distance from the motor 100 in the radial direction "R" increases as it goes in the first axial direction.

The first axial direction may be defined as a direction of the axial direction "A" in which the second seating surface 412 faces the first seating surface 411. For example, the first axial direction may be defined as a direction of the axial direction "A", in which the middle motor 100 faces a first disk 510, which will be described later. Furthermore, the second axial direction may be defined as an opposite direction to the first axial direction.

A second roller 432, which will be described later, may be seated on the second seating surface 412. For example, the second seating surface 412 may contact the second roller 432. The second seating surface 412 may extend obliquely in the first radial direction to be inclined in the second axial direction. For example, the second seating surface 412 may extend obliquely such that a spacing distance from the motor 100 in the radial direction "R" increases as it goes in the second axial direction. The second seating surface 412 may be disposed to a side that is closer to the second axial direction than the first seating surface 411.

Through the inclinations formed on the first seating surface 411 and the second seating surface 412, the second guide area 420 and the guide roller 430 may be prevented from being separated from the first guide area 410 in the axial direction "A". In other words, the wheel 200 may be prevented from being separated from the motor 100 in the axial direction "A" through the inclinations formed on the first seating surface 411 and the second seating surface 412.

Furthermore, with respect to the axial direction "A", a roller seating space, in which a portion of the guide roller 430 is located, may be formed between the first seating surface 411 and the second seating surface 412. The roller seating space may have a shape, of which a width in the axial direction "A" increases as it goes in the first radial direction.

The guide roller 430 may be disposed between the first guide area 410 and the second guide area 420 with respect to the radial direction "R". The guide roller 430 may include a plurality of rollers. The plurality of rollers may include a first roller 431 and a second roller 432.

The first roller 431 may contact the first seating surface 411 and the second guide area 420. The first roller 431 may be rotated about a first roller rotation axis (an imaginary straight line that extends in a direction, in which the first seating surface 411 extends). The first roller rotation axis may be formed to be inclined with respect to the reference rotation axis "X".

The second roller 432 may contact the second seating surface 412 and the second guide area 420. The second roller 432 may be rotated about a second roller rotation axis (an imaginary straight line that extends in a direction, in which the second seating surface 412 extends). The second roller rotation axis may be formed to be inclined with respect to the reference rotation axis "X". Furthermore, the first roller rotation axis and the second roller rotation axis may cross each other.

A plurality of disks 500 may be provided to be disposed on opposite sides of the motor 100 in the axial direction "A". The plurality of disks 500 may be arranged to be spaced apart from each other in the axial direction "A" with the motor 100 being interposed therebetween. The plurality of disks 500 may include a first disk 510 and a second disk 520.

The first disk 510 may be disposed on a side of the motor 100 in the first axial direction. The second disk 520 may be disposed on a side of the motor 100 in the second axial direction. The first disk 510 and the second disk 520 pass through a center of the wheel assembly 10, and may be arranged to be symmetrical with respect to a plane that is perpendicular to the axial direction "A".

Hereinafter, referring back to FIGS. 4 to 7, a process of operating the brake module 300 will be described.

First, the process of operating the brake module 300 while the motor 100 is stopped will be described with reference to FIGS. 5, 6, and 7.

For example, when the wheel 200 is rotated relative to the motor 100 that has stopped in the first circumferential direction C1 (or the second circumferential direction C2), the second block 320 may be moved in the first circumferential direction C1 (or the second circumferential direction C2) with respect to the first block 310. The second block 320 may be rotated with respect to the first block 310 by a rotation angle in a specific first range. The first range may be determined by a difference between a width of the guide groove 321*a* in the circumferential direction "C" and a width of the guide boss 310*a* in the circumferential direction "C". For example, as a width of the guide groove 321*a* in the circumferential direction "C" is greater than a width of the guide boss 310*a* in the circumferential direction "C", the first range may be determined to be greater.

Referring again to FIG. 5, when the second block 320 is rotated or moved in the first circumferential direction C1 (or the second circumferential direction C2) with respect to the first block 310, the first pressing bearing 341 (or the second pressing bearing 342) may be moved from the second accommodation space to the first accommodation space. When the first pressing bearing 341 (or the second pressing bearing 342) is located in the first accommodation space, the first pressing bearing 341 (or the second pressing bearing 342) may press the first free pad end (or the second free pad end) in the axial direction "A". When the first free pad end (or the second free pad end) is pressed in the axial direction "A", the first free pad end (or the second free pad end) may be moved toward the disk 500 along the axial direction "A" with respect to the first fixed pad end (or the second fixed pad end).

When the first free pad end (or the second free pad end) is moved toward the disk 500, the first free pad end (or the second free pad end) may press the disk 500 in the axial direction A" to contact the disk 500. When the first free pad end (or the second free pad end) contacts the disk 500, a frictional force may occur between the first free pad end (or the second free pad end) and the disk 500 due to contact of the first free pad end (or the second free pad end) and the disk 500. Due to the frictional force, the rotation of the disk 500 about the reference rotation axis "X" may be restricted. Furthermore, the motor 100 fixed to the disk 500 may be restricted from being rotated about the reference rotation axis "X". Furthermore, because the wheel 200 is restricted from being rotated with respect to the motor 100 while the second block 320 is maximally moved in the first circumferential direction C1 (or the second circumferential direction C2) with respect to the first block 310, the wheel 200 supported by the motor 100 that is not rotated may also be restricted from being rotated about the reference rotation axis X.

Next, referring back to FIG. 4, a process of operating the brake module 300 while the motor 100 is operated will be described.

For example, when the wheel 200 is rotated relative to the motor 100 in operation in the first circumferential direction C1 (or the second circumferential direction C2), the second block 320 may be not moved relative to the first block 310. As another example, when the wheel 200 is rotated relative to the motor 100 in operation in the first circumferential direction C1 (or the second circumferential direction C2), the second block 320 may be rotated or moved with respect to the first block 310 in the first circumferential direction C1 (or the second circumferential direction C2) by a rotation angle in a specific second range. The second range can be smaller than the first range, and may be determined by the elastic force of the pressing spring 350. For example, the second range may become smaller as an elastic modulus of the pressing spring 350 increases.

In such case, the plurality of pressing bearings 340 may be spaced apart from a plurality of free pad ends 332 in the axial direction "A", respectively. In other words, the plurality of free pad ends 332 may be not pressed in the axial direction "A". When the plurality of free pad ends 332 are not pressed in the axial direction "A", the plurality of free pad ends 332 may not press the first disk 510 and the second disk 520. Accordingly, the wheel 200 may be rotated together with the motor 100 and the disk 500, and the vehicle may be driven through the rotation of the wheel 200.

The wheel assembly according to an embodiment of the present disclosure may be applicable to small vehicles as the space required for installation can be minimized.

Figure 8:
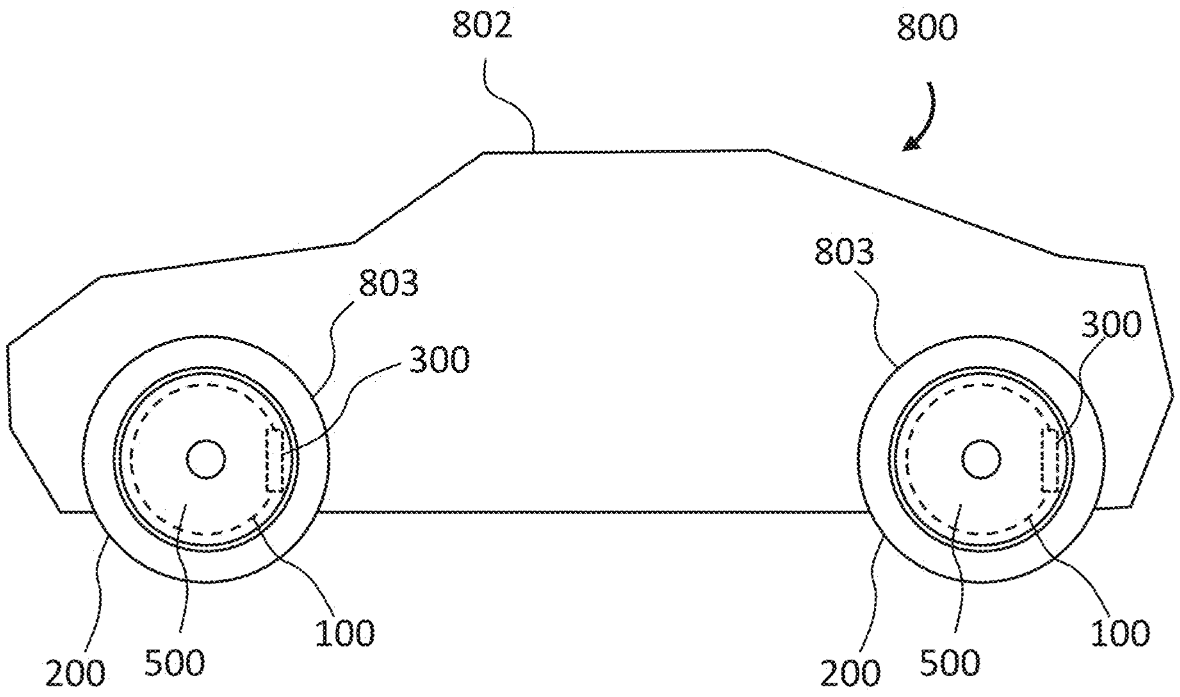
FIG. 8 is a side view of a vehicle according to an embodiment of the present disclosure.

FIG. 8 is a side view of a vehicle 800 incorporating an embodiment of the present disclosure, as described above relating to FIGS. 1-7 for example. The vehicle 800 can have a vehicle body 802. The vehicle 800 can include a wheel assembly 803 configured to move the vehicle body 802. The vehicle 800 can include a wheel 200 configured to be rotated about a reference rotation axis extending in an axial direction of the wheel assembly 803. The vehicle 800 can include a motor 100 configured to be operated to provide rotational power to the wheel 200. The vehicle 800 can include a disk 500 connected to the motor 100 and configured to be rotated about the reference rotation axis together with at least a portion of the motor. The vehicle 800 can include a brake module 300 disposed between the wheel 200 and the motor 100 in a radial direction of the wheel assembly (see also e.g., FIGS. 1-7), which can be perpendicular to the axial direction. The brake module 300 can be configured to press the disk 500 in the axial direction when the wheel 200 is rotated relative to the motor 100, an operation of which is stopped, and be spaced apart from the disk 500 in the axial direction when the rotational power is provided to the wheel 200 by an operation of the motor 100 (see also e.g., FIGS. 1-7).

In addition, the wheel assembly according to an embodiment of the present disclosure may reduce the costs required to provide a power source because the brake function may be operated only by the structural features without a separate power source.

In the above description, just because all the components constituting an example embodiment of the present disclosure are described as being combined or operating in combination, the present disclosure is not necessarily limited to this example embodiment. That is, within the scopes of purposes of the present disclosure, all of the components may operate in selective combination of one or more. In addition, terms such as "include," "comprise," or "have" described above can mean that the corresponding component may be present, and thus do not exclude other components unless specifically stated to the contrary, and rather, it can be interpreted as being able to include other components. Unless defined differently, terms including technical or scientific terms can have a same meaning as generally understood by a person of ordinary skill in the art to which the present disclosure pertains. Terms, such as terms defined in dictionaries, can be generally used, and can be construed to coincide with the context meanings of the related technologies.

The above description is an example description of technical spirits of the present disclosure, and a person of ordinary skill in the art to which the present disclosure pertains may make various corrections and modifications without departing from the characteristics and scopes of the present disclosure. Therefore, the example embodiments disclosed in the present disclosure are not necessarily for limiting the technical spirits of the present disclosure but for describing them, and scopes of the technical spirits of the present disclosure are not necessarily limited by the example embodiments. The protection scopes of the present disclosure can be construed by the following claims, and all technical spirits in equivalent ranges can be construed as being included in scopes of the present disclosure.

What is claimed is:

1. A wheel assembly comprising:

a wheel configured to be rotated about a reference rotation axis extending in an axial direction of the wheel assembly;

a motor configured to provide rotational power to the wheel;

a disk connected to the motor and configured to be rotated about the reference rotation axis together with at least a portion of the motor; and a brake module disposed between the wheel and the motor in a radial direction of the wheel assembly, the radial direction being perpendicular to the axial direction, wherein the brake module is configured to press the disk in the axial direction when the wheel is rotated relative to the motor, an operation of which is stopped by the brake module, and wherein the brake module is configured to be spaced apart from the disk in the axial direction when the rotational power is provided to the wheel by an operation of the motor.

2. The wheel assembly of claim 1, wherein the brake module comprises:

a first block fixed to the motor;

a second block fixed to the wheel, wherein the second block is configured to be moved in a circumferential direction of the wheel assembly with respect to the first block when the wheel is rotated relative to the motor; and a brake pad disposed to face the disk in the axial direction, wherein at least a portion of the brake pad is configured to press the disk as the second block is moved.

3. The wheel assembly of claim 2, further comprising:

a guide boss extending in the radial direction of the wheel assembly in the first block or the second block; and a guide groove, into which the guide boss is inserted in the radial direction, in the second block if the guide boss is in the first block, or in the first block if the guide boss is in the second block, wherein the guide groove and the guide boss extend along the circumferential direction of the wheel assembly, wherein a width of the guide groove in the circumferential direction is greater than a width of the guide boss in the circumferential direction, and wherein the guide boss is configured to be moved in the circumferential direction along the guide groove.

4. The wheel assembly of claim 3, wherein the motor faces the wheel in a first radial direction of the radial direction, wherein the guide boss has a shape protruding in the first radial direction, wherein the guide groove has a shape recessed in the first radial direction, and wherein the guide boss is inserted into the guide groove in the first radial direction.

5. The wheel assembly of claim 3, wherein axial widths of the guide groove and the guide boss in the axial direction are smaller than circumferential widths of the guide groove and the guide boss in the circumferential direction.

6. The wheel assembly of claim 2, wherein the brake pad further comprises:

a fixed pad end fixed to a side of the second block in the axial direction; and a free pad end extending from one side of the fixed pad end in the circumferential direction, wherein the free pad end is configured to be moved along the axial direction with respect to the fixed pad end.

7. The wheel assembly of claim 6, wherein the disk further comprises:

a first disk disposed on an outer side of the motor in the axial direction, and a second disk disposed on an inner side of the motor in the axial direction;

wherein the brake pad comprises:

a first brake pad configured to press the first disk to the outer side in the axial direction, and a second brake pad configured to press the second disk to the inner side in the axial direction; and wherein the first brake pad and the second brake pad are disposed to be spaced apart from each other in the axial direction with the second block being interposed between the first brake pad and the second brake pad.

8. The wheel assembly of claim 2, wherein the second block further comprises:

a central area defining a central portion of the second block, wherein the central area is connected to the brake pad; and an extension area extending from the central area to one side in the circumferential direction, wherein the extension area is spaced apart from the brake pad in the axial direction, and wherein the extension area includes an inclined surface extending to be inclined such that a spacing distance from the brake pad in the axial direction becomes larger as it becomes more distant from the central area.

9. The wheel assembly of claim 8, wherein the brake module further comprises a pressing bearing configured to press the brake pad due to relative rotation of the wheel to the motor, and wherein the pressing bearing is accommodated in an accommodation space formed between the brake pad and the inclined surface of the extension area of the second block.

10. The wheel assembly of claim 9, wherein when the wheel assembly is viewed from one side of the wheel assembly in the axial direction in parallel to the axial direction, at least a portion of the pressing bearing, at least a portion of the inclined surface of the extension area of the second block, and at least a portion of the brake pad overlap each other.

11. The wheel assembly of claim 9, wherein the inclined surface comprises:

a first inclined section, of which a first spacing distance from the brake pad to the first inclined section in the axial direction is equal to or smaller than a bearing width of the pressing bearing in the axial direction, and a second inclined section, of which a second spacing distance from the brake pad to the second inclined section in the axial direction is greater than the bearing width of the pressing bearing in the axial direction;

wherein the accommodation space comprises:

a first accommodation space formed between the brake pad and the first inclined section, and a second accommodation space formed between the brake pad and the second inclined section;

wherein the pressing bearing is configured to press the brake pad while contacting the brake pad while being located in the first accommodation space; and wherein the pressing bearing is configured to be spaced apart from the brake pad while being located in the second accommodation space.

12. The wheel assembly of claim 11, wherein the first block further comprises a seating area located between the pressing bearing while in the second accommodation space and the brake pad;

wherein the seating area defines a seating space for seating the pressing bearing;

wherein the seating area includes:

a first surface disposed to face the brake pad; and a second surface located on an opposite side to the first surface in the axial direction; and wherein the second surface is extends to be inclined such that the second spacing distance from the brake pad in the axial direction becomes smaller as it becomes more distant from the central area.

13. The wheel assembly of claim 12, wherein the brake module further comprises a pressing spring disposed at one end on the side of the extension area in the circumferential direction, and wherein the pressing spring is configured to press the pressing bearing while in the second accommodation space in a direction facing the seating area.

14. The wheel assembly of claim 13, wherein the pressing spring further comprises:

a recess area, into which the extension area is inserted, and having a shape in which the central area is recessed in a direction facing the extension area, and a contact area extending to be inclined to become closer to the central area as it goes from the recess area in the axial direction, and of which an end in the axial direction is configured to contact the pressing bearing.

15. The wheel assembly of claim 13, wherein the seating area further comprises a third surface extending from the second surface in the axial direction, and wherein the third surface is disposed to face the pressing spring in the circumferential direction.

16. The wheel assembly of claim 2, wherein the first block is fixed to an outer peripheral surface of the motor, and wherein the second block is fixed to an inner peripheral surface of the wheel.

17. The wheel assembly of claim 2, wherein each of the first block and the second block has a shape being symmetrical with respect to the axial direction.

18. The wheel assembly of claim 17, wherein each of the first block and the second block has a shape being symmetrical with respect to the circumferential direction.

19. The wheel assembly of claim 18, wherein the brake module further comprises:

a plurality of pressing bearings configured to press the brake pad due to relative rotation of the wheel to the motor, and wherein the plurality of pressing bearings are disposed to be spaced apart from each other between the first block and the second block, and are arranged to be symmetrical with respect to the axial direction and the circumferential direction.

20. The wheel assembly of claim 1, further comprising:

a shaft passing through a center of the motor and a center of the disk, and defining the reference rotation axis.

21. A wheel assembly comprising:

a wheel configured to be rotated about a reference rotation axis extending in an axial direction of the wheel assembly;

a motor configured to provide rotational power to the wheel;

a disk connected to the motor and configured to be rotated about the reference rotation axis together with at least a portion of the motor;

at least one brake module disposed between the wheel and the motor in a radial direction of the wheel assembly, the radial direction being perpendicular to the axial direction, wherein the brake module is configured to press the disk in the axial direction when the wheel is rotated relative to the motor, an operation of which is stopped by the brake module, and wherein the brake module is configured to be spaced apart from the disk in the axial direction when the rotational power is provided to the wheel by an operation of the motor; and at least one guide unit disposed between an outer peripheral surface of the motor and an inner peripheral surface of the wheel, and configured to guide relative rotation of the wheel to the motor.

22. The wheel assembly of claim 21, wherein the guide unit further comprises:

a first guide area connected to the outer peripheral surface of the motor;

a second guide area connected to the inner peripheral surface of the wheel, and spaced apart from the first guide area in the radial direction of the wheel assembly; and a guide roller disposed between the first guide area and the second guide area in the radial direction, and configured to guide movement of the second guide area with respect to the first guide area in a circumferential direction of the wheel assembly.

23. The wheel assembly of claim 22, wherein the guide roller further comprises a first roller and a second roller spaced apart from each other along the axial direction;

wherein the first guide area includes:

a first guide seating surface, on which the first roller is seated, and a second guide seating surface, on which the second roller is seated;

wherein a roller seating space, in which a portion of the guide roller is located, is formed between the first guide seating surface and the second guide seating surface, in the axial direction;

wherein the motor faces the wheel in a first radial direction of the radial direction; and wherein the roller seating space has a roller-seating-space shape, of which a width in the axial direction becomes larger as it goes in the first radial direction.

24. The wheel assembly of claim 23, wherein the second guide seating surface faces the first guide seating surface in a first axial direction of the axial direction, wherein a second axial direction is opposite to the first axial direction, wherein the first guide seating surface extends to be inclined to have a first shape, of which a first spacing distance from the motor in the radial direction becomes larger as it goes in the first axial direction, wherein the second guide seating surface extends to be inclined to have a second shape, of which a second spacing distance from the motor in the radial direction becomes larger as it goes in the second axial direction, wherein the first roller is configured to be rotated about a first roller rotation axis extending in a first direction in which the first guide seating surface extends, and wherein the second roller extends in a second direction, in which the second guide seating surface extends, and is configured to be rotated about a second roller rotation axis crossing the first roller rotation axis.

25. The wheel assembly of claim 21, wherein the at least one guide unit comprises a plurality of guide units and the at least one brake module comprises a plurality of brake modules, and wherein the plurality of guide units and the plurality of brake modules are alternately arranged along a circumferential direction of the wheel assembly.

26. A vehicle comprising:

a vehicle body; and a wheel assembly configured to move the vehicle body, wherein the wheel assembly includes:

a wheel configured to be rotated about a reference rotation axis extending in an axial direction of the wheel assembly, a motor configured to provide rotational power to the wheel, a disk connected to the motor and configured to be rotated about the reference rotation axis together with at least a portion of the motor, and a brake module disposed between the wheel and the motor in a radial direction of the wheel assembly, the radial direction being perpendicular to the axial direction, wherein the brake module is configured to press the disk in the axial direction when the wheel is rotated relative to the motor, an operation of which is stopped by the brake module, and wherein the brake module is configured to be spaced apart from the disk in the axial direction when the rotational power is provided to the wheel by an operation of the motor.

* * * * *